United States Patent
Xu

(10) Patent No.: US 12,490,025 B2
(45) Date of Patent: Dec. 2, 2025

(54) AUDIO DATA TRANSMISSION METHOD, SYSTEM AND DEVICE

(71) Applicant: Zgmicro Wuxi Corporation, Jiangsu (CN)

(72) Inventor: Bin Xu, Hefei (CN)

(73) Assignee: Zgmicro Wuxi Corporation, Wuxi (CN)

( * ) Notice: Subject to any disclaimer, the term of this patent is extended or adjusted under 35 U.S.C. 154(b) by 655 days.

(21) Appl. No.: 17/953,921

(22) Filed: Sep. 27, 2022

(65) Prior Publication Data

US 2023/0016757 A1    Jan. 19, 2023

Related U.S. Application Data

(63) Continuation of application No. PCT/CN2021/081984, filed on Mar. 22, 2021.

(51) Int. Cl.
*H04R 3/12*        (2006.01)
*H04B 17/318*      (2015.01)
(Continued)

(52) U.S. Cl.
CPC ............. *H04R 3/12* (2013.01); *H04B 17/318* (2015.01); *H04L 43/0847* (2013.01); *H04S 1/00* (2013.01);
(Continued)

(58) Field of Classification Search
CPC ...... H04R 3/12; H04R 2420/07; H04R 5/033; H04B 17/318; H04L 43/0847; H04S 1/00;
(Continued)

(56) References Cited

U.S. PATENT DOCUMENTS

2019/0230459 A1*   7/2019   Sridharan .............. H04K 3/80
2020/0107127 A1*   4/2020   Gong .................... H04R 5/033

FOREIGN PATENT DOCUMENTS

CN    104272673 A    1/2015
CN    107018484 A    8/2017
(Continued)

OTHER PUBLICATIONS

International Search Report received for PCT/CN2021/081984, dated Jun. 8, 2021.
(Continued)

*Primary Examiner* — Eugene Yun
(74) *Attorney, Agent, or Firm* — Zhong Law, LLC

(57) ABSTRACT

An audio data transmission method, an audio data transmission system, and an audio data transmission device are described. The audio data transmission method comprises: receiving first channel audio data from an audio source device based on a wireless communication protocol by a first audio data receiving device, receiving second audio channel audio data from the audio source device based on the wireless communication protocol by a second audio data receiving device, starting to receive the first channel audio data and the second channel audio data by one of the first and second audio data receiving devices when a communication quality between the audio source device and another one of the first and second audio data receiving devices fails to meet a preset requirement; and forwarding the first or second channel audio data from the one of the first and second audio data receiving devices to the another one of the first and second audio data receiving device. Thus, the present invention utilizes characteristics of independent fading at different spatial positions, improves reliability of wireless communication and enhances communication quality through a spatial diversity gain.

19 Claims, 4 Drawing Sheets

(51) Int. Cl.
    *H04L 43/0823*     (2022.01)
    *H04S 1/00*     (2006.01)
    *H04W 76/10*     (2018.01)
    *H04W 76/30*     (2018.01)

(52) U.S. Cl.
    CPC ........... *H04W 76/10* (2018.02); *H04W 76/30* (2018.02); *H04R 2420/07* (2013.01)

(58) Field of Classification Search
    CPC ..... H04W 76/10; H04W 76/30; H04W 76/14; H04W 84/18; H04W 4/80
    USPC ........................................................ 455/135
    See application file for complete search history.

(56) References Cited

FOREIGN PATENT DOCUMENTS

| | | |
|---|---|---|
| CN | 109041142 A | 12/2018 |
| CN | 109842873 A | 6/2019 |
| CN | 110234045 A | 9/2019 |
| CN | 111464988 A | 7/2020 |
| WO | 2017142139 A1 | 8/2017 |

OTHER PUBLICATIONS

Written Opinion of the International Searching Authority received for PCT/CN2021/081984, dated Jun. 8, 2021.

First Office Action received for Chinese Application No. 202010235062.6, dated Dec. 19, 2022.

First Objection Decision received for Chinese Application No. 202010235062.6, dated May 19, 2023.

\* cited by examiner

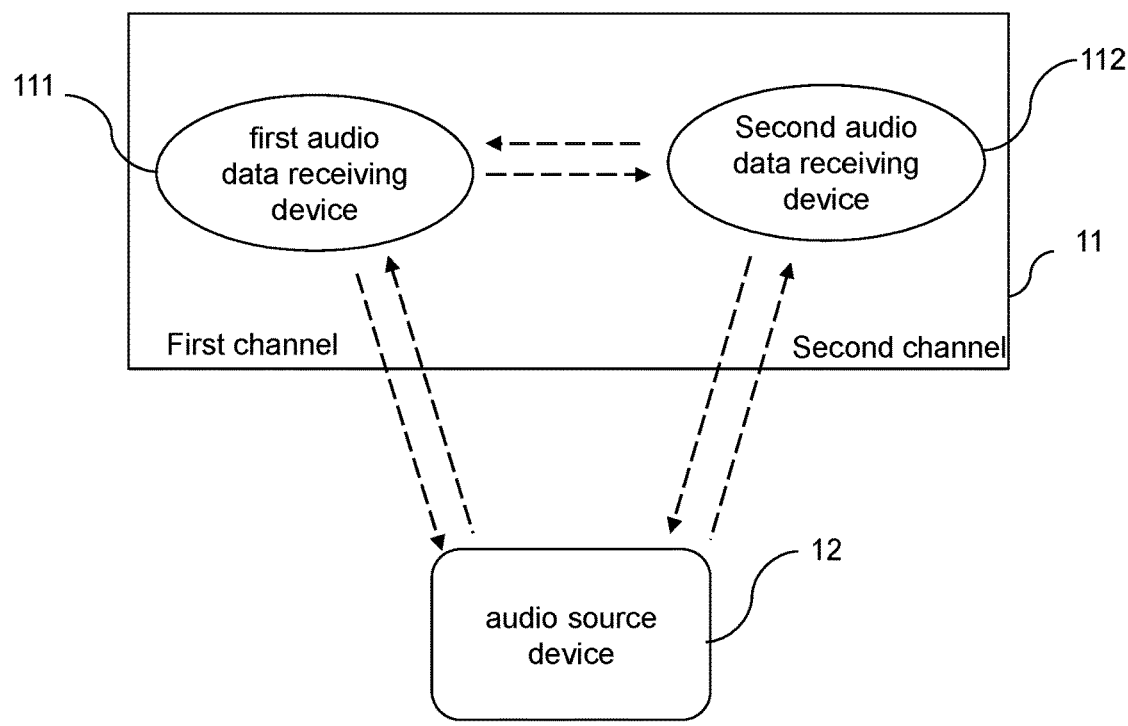

FIG. 1

200 the other of the first audio data receiving device and the second audio data receiving device starts to receive the first channel audio data and the second channel audio data when it is determined that a communication quality between the audio source device and one of the first audio data receiving device and the second audio data receiving device does not meet a preset requirement — S21 the other of the first audio data receiving device and the second audio data receiving device forwards corresponding channel audio data to the one of the first audio data receiving device and the second audio data receiving device — S22

FIG. 2

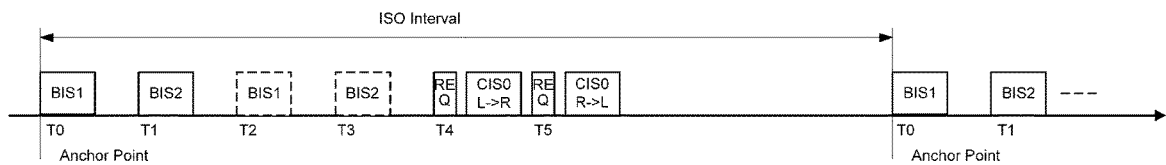

FIG. 5

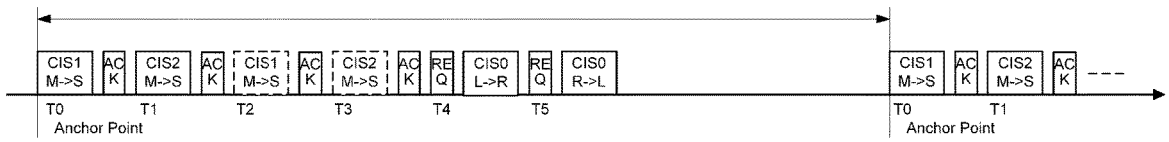

FIG. 6

| the audio source device instructs the other of the first audio data receiving device and the second audio data receiving device to start receiving the first audio channel audio data and the second channel audio data when the audio source device determines that the communication quality between one of the first audio data receiving device and the second audio data receiving device and itself does not meet a preset requirement | S701 |
|---|---|

↓

| the audio source device notifies the other of the first audio data receiving device and the second audio data receiving device to forward corresponding channel audio data to the one audio data receiving device whose communication quality does not meet the preset requirement | S702 |
|---|---|

FIG. 7

AUDIO DATA TRANSMISSION METHOD, SYSTEM AND DEVICE

CROSS-REFERENCE TO RELATED APPLICATIONS

This application claims the priority of PCT/CN2021/081984 based on Chinese Patent Application No. 202010235062.6 filed in China on Mar. 27, 2020, the entire contents of which are incorporated herein by reference.

BACKGROUND OF THE INVENTION

Field of the Invention

The present invention relates to the area of wireless transmission, and in particular to an audio data transmission method, an audio data transmission method and an audio data transmission device.

Description of the Related Art

An extensive development in Bluetooth technology has made Bluetooth products gradually improved. Stereo audio playback devices such as Bluetooth headphones and Bluetooth speakers on smartphones bring people a better user experience. In particular, the stereo playback devices that are completely wirelessly connected, such as dual wireless stereo Bluetooth headphones and dual wireless stereo Bluetooth speakers, are more popular.

In prior art technology, a left channel audio data receiving device and a right channel audio data receiving device in a wireless stereo audio playback device respectively establish a Connected Isochronous Stream (CIS) link or a Broadcast Isochronous Stream (BIS) link with an audio source device to receive and play left channel audio data and right channel audio data respectively. The two CIS or BIS links connected to the left and right channel audio data receiving devices respectively form a connected isochronous group (CIG) or a broadcast isochronous group (BIG) to realize synchronous playback of the left and right channels.

Both CIS and BIS communication protocols have characteristics that encoded audio data is sent for a limited number of times within a fixed communication interval to ensure low latency, synchronization and communication performance of audio data transmission. However, in an increasingly complex interference and fading environment, especially when there is occlusion in long-distance transmission, it is difficult to ensure communication quality or reliability with limited number of times of transmission.

Therefore, it is necessary to propose an improved technical scheme to solve the above problems.

SUMMARY OF THE INVENTION

The present invention provides an audio data transmission method, an audio data transmission method and an audio data transmission device to improve a performance of audio data transmission.

To achieve the purpose, according one aspect of the present invention, an audio data transmission method is provided. The audio data transmission method comprises: receiving a first channel audio data from an audio source device based on a wireless communication protocol by a first audio data receiving device; receiving a second audio channel audio data from the audio source device based on the wireless communication protocol by a second audio data receiving device; starting to receive the first channel audio data and the second channel audio data by the other of the first audio data receiving device and the second audio data receiving device when a communication quality between the audio source device and one of the first audio data receiving device and the second audio data receiving device does not meet a preset requirement; and forwarding corresponding channel audio data to the one of the first audio data receiving device and the second audio data receiving device by the other of the first audio data receiving device and the second audio data receiving device.

According another aspect of the present invention, an audio data transmission system is provided. The audio data transmission system comprises: an audio source device; a first audio receiving device configured for receiving a first channel audio data from the audio source device based on a wireless communication protocol; a second audio receiving device configured for receiving a second channel audio data from the audio source device based on the wireless communication protocol. The other of the first audio data receiving device and the second audio data receiving device starts to receive the first channel audio data and the second channel audio data when a communication quality between the audio source device and one of the first audio data receiving device and the second audio data receiving device does not meet a preset requirement, and further forwards corresponding channel audio data to the one of the first audio data receiving device and the second audio data receiving device.

According another aspect of the present invention, an audio data receiving device is provided. The audio data receiving device comprises: a wireless transceiver configured for receiving a first channel audio data from an audio source device based on a wireless communication protocol; a processor configured to control the wireless transceiver to start to receive the first channel audio data and a second channel audio data corresponding to a second audio data receiving device when a communication quality between the second audio data receiving device and the audio source device does not meet a preset requirement, and further control the wireless transceiver to forward the second channel audio data to the second audio data receiving device.

In the present invention, the other of the first audio data receiving device and the second audio data receiving device receives the first channel audio data and the second channel audio data are simultaneously, and forwards corresponding channel audio data to one of the first audio data receiving device and the second audio data receiving device which has a poorer communication quality. In this way, in the case of long distance or occlusion, as long as one of the two audio data receiving devices can receive corresponding audio data packet from the audio source device correctly, the communication quality of dual channels is not affected. Therefore, a reliability of wireless communication is improved through a spatial diversity gain by utilizing a characteristic of independent fading at different spatial positions.

There are many other objects, together with the foregoing attained in the exercise of the invention in the following description and resulting in the embodiment illustrated in the accompanying drawings.

BRIEF DESCRIPTION OF THE DRAWINGS

These and other features, aspects, and advantages of the present invention will become better understood with regard to the following description, appended claims, and accompanying drawings wherein:

FIG. 1 is a block diagram showing an application scenario of an audio data transmission method according to one embodiment of the present invention;

FIG. 2 is a schematic flowchart of the audio data transmission method according to one embodiment of the present invention;

FIG. 5 is a BIG-based space diversity timeslot structure provided according to one embodiment of the present invention;

FIG. 6 is a CIG-based space diversity timeslot structure provided according to one embodiment of the present invention;

FIG. 7 is a schematic flowchart of the audio data transmission method according to still another embodiment of the present invention;

DETAILED DESCRIPTION OF THE PREFERRED EMBODIMENTS

Figure 3:
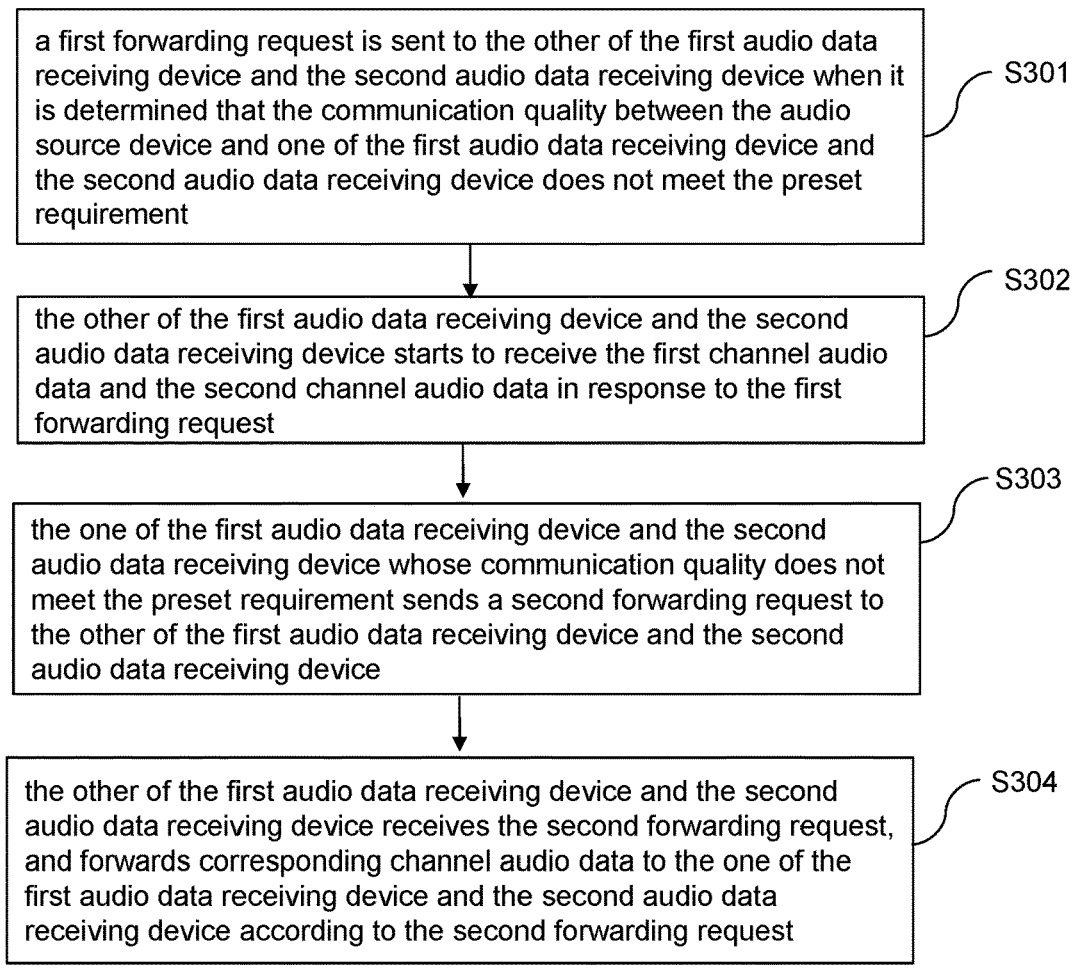
FIG. 3 is a schematic flowchart of the audio data transmission method according to one embodiment of the present invention.

The detailed description of the invention is presented largely in terms of procedures, operations, logic blocks, processing, and other symbolic representations that directly or indirectly resemble the operations of data processing devices that may or may not be coupled to networks. These process descriptions and representations are typically used by those skilled in the art to most effectively convey the substance of their work to others skilled in the art.

Reference herein to "one embodiment" or "an embodiment" means that a particular feature, structure, or characteristic described in connection with the embodiment can be comprised in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations in the invention.

As shown in FIG. 1, a typical application scenario of an audio data transmission method according to one embodiment of the present invention is that a first audio data receiving device 111 receives a first channel audio data from an audio source device 12 based on a wireless communication protocol, and a second audio data receiving device 112 receives a second channel audio data from the audio source device 12 based on the wireless communication protocol.

The audio source device 12 can be one of mobile phones (such as iPhone, BlackBerry, etc.), portable game consoles, portable media players (such as MP3 players, iPods, etc.), computers (such as PCs, Apple computers, etc.), audio/video receivers (such as, A/V receivers that are part of a home entertainment or home theater system), and televisions, etc.

The first audio receiving device 111 and the second audio receiving device 112 can be set as one equipment, device or module that can receive audio signals wirelessly and/or wiredly. Especially, the first audio receiving device 111 and the second audio receiving device 112 can be used as electroacoustic transducers that can convert audio data into sound, such as home or professional speakers, car speakers, portable music players, left and right speakers in headphones or mobile phones, etc. In one embodiment, the first audio receiving device 111 and the second audio receiving device 112 forms a dual channel audio data playback device 11.

The wireless communication protocol can be a Bluetooth communication protocol, a WiFi communication protocol, or other various wireless communication protocols suitable for implementation of the present invention. As a typical application, the wireless communication protocol is a Bluetooth Low Energy (BLE) wireless communication protocol.

The BLE wireless communication protocol comprises a Connected Isochronous Stream (CIS) protocol of point-to-point communication, a Broadcast Isochronous Stream (BIS) protocol of point-to-multipoint communication, a Connected Isochronous Group (CIG) protocol composed of at least one CIS and a Broadcast Isochronous Group (BIG) protocol composed of at least one BIS. For example, a left channel audio data receiving device establishes a CIS link or a BIS link with the audio source device to receive a left channel audio data, and a right channel audio data receiving device establishes a CIS link or a BIS link with the audio source device to receive a right channel audio data.

The two communication protocols CIS and BIS have following characteristics that an encoded audio data is sent for a limited number of times within a fixed communication interval. However, in an increasingly complex interference and fading environment, especially when there is occlusion in long-distance transmission, it is difficult to ensure communication quality or reliability with limited number of times of transmission. In fact, similar problems may also exist in audio data transmission under a classic Bluetooth communication protocol or other short-range wireless communication protocols.

FIG. 2 is a schematic flowchart of the audio data transmission method according to one embodiment of the present invention. Referring to FIG. 2, the audio data transmission method 200 comprises following operations. At S21, when it is determined that a communication quality between the audio source device 12 and one of the first audio data receiving device 111 and the second audio data receiving device 112 does not meet the preset requirement, the other of the first audio data receiving device 111 and the second audio data receiving device 112 starts to receive the first channel audio data and the second channel audio data.

At S22, the other of the first audio data receiving device 111 and the second audio data receiving device 112 forwards corresponding channel audio data to the one of the first audio data receiving device 111 and the second audio data receiving device 112 whose communication quality does not meet the preset requirement. In one embodiment, the audio data transmission method 200 further comprises: the communication quality between the first audio data receiving device 111 and the audio source device 12 and/or between the second audio data receiving device 112 and the audio source device 12 are detected; and then whether the communication quality between the first audio data receiving device 111 and the audio source device 12 and/or between the second audio data receiving device 112 and the audio source device 12 meet the preset requirement is determined. Specifically, the communication quality between the audio source device 12 and each one of the first audio data receiving device 111 and the second audio data receiving device 112 is detected. Alternatively, the communication quality between the audio source device 12 and specific one of the first audio data receiving device 111 and the second audio data receiving device 112 is detected.

In one embodiment, when a signal strength of a radio frequency signal received by the first audio data receiving device 111 or the second audio data receiving device 112 from the audio source device 12 is lower than a preset first threshold value, or an error rate of audio data received by the first audio data receiving device 111 or the second audio data receiving device 112 is higher than a preset error rate threshold value, it is determined that the communication quality between the first audio data receiving device 111 and the audio source device 12 or between the second audio data receiving device 112 and the audio source device 12 does not meet the preset requirement.

In one embodiment, the other of the first audio data receiving device 111 and the second audio data receiving device 112 receives a first forwarding request, and starts to receive the first channel audio data and the second channel audio data in response to the first forwarding request. The first forwarding request comes from the one of the first audio data receiving device 111 and the second audio data receiving device 112 whose communication quality does not meet the preset requirement, or comes from the audio source device 12.

In the present invention, the one of the first audio data receiving device 111 and the second audio data receiving device 112 can be simplified as the one audio data receiving device 112 sometimes, and the other of the first audio data receiving device 111 and the second audio data receiving device 112 can be simplified as the other audio data receiving device 112 sometimes. In another alternative embodiment, the other audio data receiving device actively starts to receive the first channel audio data and the second channel audio data when it is determined that the communication quality between the one audio data receiving device and the audio source device 12 does not meet the preset requirement.

In one embodiment, the other audio data receiving device actively forwards corresponding channel audio data to the one audio data receiving device whose communication quality does not meet the preset requirement when the other audio data receiving device starts to receive the first channel audio data and the second channel audio data. In alternative embodiment, the other audio data receiving device receives a second forwarding request, and forwards corresponding channel audio data in response to the second forwarding request. The second forwarding request may be a preset forwarding request instruction, which may also comprise information of data packets requested to be forwarded (such as the number of lost data packet, a sequence number of lost packet, etc.), and may also comprise information of data packet correctly received by the one audio data receiving device whose communication quality does not meet the preset requirement (such as a sequence number of the last data packet correctly received, etc.). The second forwarding request may come from the one audio data receiving device whose communication quality does not meet the preset requirement.

In one embodiment, a wireless communication connection between the first audio data receiving device 111 and the second audio data receiving device 112 is established. When the communication quality between the audio source device and the one audio data receiving device does not meet the preset requirement, an audio stream transmission link between the first audio data receiving device 111 and the second audio data receiving device 112 is established for forwarding the first channel audio data or the second channel audio data.

In one alternative embodiment, the first audio data receiving device 111 and the second audio data receiving device 112 can communicate with each other in a wired manner based on a wired connection. A relative relationship between the first audio data receiving device 111 and the second audio data receiving device 112 may be a peer-to-peer relationship or a master-slave relationship.

FIG. 3 is a schematic flowchart of the audio data transmission method according to one specific embodiment of the present invention, wherein the first audio data receiving device 111 and the second audio data receiving device 112 are in a peer-to-peer relationship. Referring to FIG. 3, the audio data transmission method comprises the following operations. At S301, a first forwarding request is sent to the other of the first audio data receiving device 111 and the second audio data receiving device 112 when it is determined that the communication quality between the audio source device 12 and one of the first audio data receiving device 111 and the second audio data receiving device 112 does not meet the preset requirement.

At S302, the other of the first audio data receiving device 111 and the second audio data receiving device 112 starts to receive the first channel audio data and the second channel audio data in response to the first forwarding request. At S303, the one of the first audio data receiving device 111 and the second audio data receiving device 112 whose communication quality does not meet the preset requirement sends a second forwarding request to the other of the first audio data receiving device 111 and the second audio data receiving device 112.

At S304, the other of the first audio data receiving device 111 and the second audio data receiving device 112 receives the second forwarding request, and forwards corresponding channel audio data to the one of the first audio data receiving device and the second audio data receiving device according to the second forwarding request. Taking dual-channel as an example, the first channel is either the left channel or the right channel, and the second channel corresponds to the other channel. For example, the first audio data receiving device 111 corresponds to the left channel, and the second audio data receiving device 112 corresponds to the right channel.

Before sending the first forwarding request, the first audio data receiving device 111 is configured to receive the first channel audio data, and the second audio data receiving device 112 is configured to receive the second channel audio data. For example, the first audio data receiving device only receives a left channel audio data, while the second audio data receiving device only receives a right channel audio data.

When it is determined that the communication quality of at least one channel is poor, a forwarding mechanism is started, and one side with poor communication quality sends the first forwarding request to the other side. The operation of S301 can be implemented according to the following two embodiments. First embodiment of the operation of S301

Based on a communication connection between the first audio data receiving device 111 and the second audio data receiving device 112 established in advance, it is determined whether the current communication quality of the left channel or the right channel meets the preset requirement. The first audio data receiving device 111 and the second audio data receiving device 112 can detect the communication quality between themselves and the audio source device 12 respectively. After it is determined that the communication quality is lower than the preset requirement, for example, when it is determined that the communication quality between the first audio data receiving device 111 and the audio source device 12 is lower than the preset requirement, the first audio data receiving device 111 sends the first forwarding request to the second audio data receiving device 112. The first forwarding request prompts the second audio data receiving device 112 to start to receive the left channel audio data and the right channel audio data.

For example, a BLE wireless connection is established between the first audio data receiving device 111 and the second audio data receiving device 112 in advance. When the first audio data receiving device 111 determines that the communication quality of the first channel is poor, such as the signal strength of the received RF signal is low or the error rate of the received audio data is high, the first audio data receiving device 111 sends the first forwarding request to the second audio data receiving device 112 based on the BLE wireless connection established in advance.

Second Embodiment of the Operation of S301

It is determined whether the current communication quality of each of the left channel and right channel meets the preset requirement. That is, it is determined whether the current communication quality of each of the first audio data receiving device 111 and the second audio data receiving device 112 meets the preset requirement is determined. After it is determined that the communication quality of one audio data receiving device is lower than the preset requirement, the communication connection between the first audio data receiving device 111 and the second audio data receiving device 112 is established. In this way, the communication connection is established only when necessary. When the communication quality of the left and right channels is good and the audio data can be received normally, there is no need to establish the communication connection between the first audio data receiving device 111 and the second audio data receiving device 112, thereby reducing an occupation of link resources.

For example, in the process of audio data transmission, when it is found that the communication quality of the left channel is poor and the audio data of the left channel may not be received normally, the BLE wireless connection between the first audio data receiving device 111 and the second audio data receiving device 112 is established. The first audio data receiving device 111 sends the first forwarding request to the second audio data receiving device 112, and then a forwarding state is entered.

It should be noted that the communication connection between the first audio data receiving device 111 and the second audio data receiving device 112 may be one of the BLE wireless connection, an ultrasonic connection, an near-field communication connection and a wired connection, and is not limited to the BLE wireless connection.

In one embodiment, the communication quality of the channel can be determined according to a received signal strength indication (RSSI) of the channel or an error rate of the received audio data. When the signal strength of the radio frequency received by the first audio data receiving device 111 or the second audio data receiving device 112 from the audio source device 12 is lower than a preset first threshold value, or the error rate of the received audio data is higher than a preset error rate threshold value, it is determined that the communication quality between the first audio data receiving device 111 or the second audio data receiving device 112 and the audio source device 12 does not meet the preset requirement. For example, the first threshold value is set to −85 to −95 dBm, and the error rate threshold value can be set to 45%-55%. The first threshold value and the error rate threshold value can be determined by those skilled in the art according to the actual scenario. The present invention will not list them one by one.

In order to realize audio data forwarding, when it is determined that the communication quality of one channel does not meet the preset requirement, an audio stream transmission link between the first audio data receiving device 111 and the second audio data receiving device 112 is also established for forwarding the first channel audio data or the second channel audio data. When the communication connection between the first audio data receiving device 111 and the second audio data receiving device 112 is the BLE wireless connection, the audio stream transmission link may be a CIS link based on a BLE communication protocol. Through the audio stream transmission link, the second audio data receiving device 112 can forward the first channel audio data to the first audio data receiving device 111.

Next, the one audio data receiving device whose communication quality does not meet the preset requirement sends a second forwarding request to the other audio data receiving device. In response to the received second forwarding request, the other audio data receiving device forwards corresponding channel audio data to the one audio data receiving device whose communication quality does not meet the preset requirement. For example, the first audio data receiving device sends the second forwarding request to the second audio data receiving device, and the second audio data receiving device forwards the first audio channel audio data to the first audio data receiving device in response to the received second forwarding request.

In one embodiment, the first audio data receiving device and the second audio data receiving device communicate with the audio source device through a spatial diversity timeslot structure of BIG or CIG based on the BLE communication protocol respectively. In addition, the forwarding of the corresponding channel audio data is also completed in the space diversity slot structure. Each isochronous interval in the space diversity timeslot structure comprises a receiving timeslot and one or more retransmission timeslot for receiving the first channel audio data and/or the second channel audio data from the audio source device 12, and also comprises a forwarding timeslot for forwarding audio data between the first audio data receiving device 111 and the second audio data receiving device 112.

In one embodiment, each isochronous interval in the space diversity timeslot structure further comprises a forwarding retransmission timeslot for re-forwarding audio data between the first audio data receiving device 111 and the second audio data receiving device 112. In one further embodiment, each of the forwarding timeslot and the forwarding retransmission timeslot comprises a request sub-timeslot and a forwarding sub-timeslot. The request sub-timeslot is configured for sending or receiving a second forwarding request by the first audio data receiving device 111 or the second audio data receiving device 112. The forwarding sub-timeslot is configured for forwarding audio data between the first audio data receiving device 111 and the second audio data receiving device 112.

For example, in the request sub-timeslot, the first audio data receiving device 111 sends the second forwarding request to the second audio data receiving device 112. In the forwarding sub-timeslot, the second audio data receiving device 112 forwards the received first channel audio data to the first audio data receiving device 111. In other words, in one forwarding request, from a perspective of a requested party, the requested party receives the second forwarding request in the request sub-timeslot, and the requested party forwards corresponding channel audio data to a requesting party in the forwarding sub-timeslot.

Optional, each isochronous interval in the space diversity timeslot structure further comprises other timeslots used for one or more of interacting communication quality information, forwarding control commands, and maintaining the communication connection between the first audio data receiving device and the second audio data receiving device. For example, the first forwarding request can be sent in the other timeslots.

To facilitate understanding, the above description is only described from the perspective of unilateral forwarding. In actual application scenarios, the forwarding between the first audio data receiving device 111 and the second audio data receiving device 112 can be unilateral forwarding or bilateral mutual forwarding. For example, if the BLE wireless connection is established between the first audio data receiving device and the second audio data receiving device, when the communication quality on both parties is poor, a mutual forwarding state is entered. That is, the both parties send the first forwarding request to each other so that the both parties enters a state of receiving two channels audio data, and then the both parties send a second forwarding request to each other, and receive corresponding channel audio data forwarded by the other party based on the audio stream transmission link, such as the CIS link. In this way, each channel audio data is received by two audio data receiving devices, and the probability that two audio data receiving devices located at different locations in space cannot receive signals correctly at the same time is significantly lower than the probability that one location in space cannot receive signals correctly. Thus, the probability of correctly receiving audio data is improved.

The audio data transmission method provided according to one embodiment of the present invention is suitable for the audio data receiving devices with left and right channels in a peer-to-peer structure, and is also suitable for the audio data receiving devices with left and right channels in a master-slave structure. When a relative relationship between the first audio data receiving device 111 and the second audio data receiving device 112 is a master-slave relationship, that is, one of the first audio data receiving device 111 and the second audio data receiving device 112 is a master device, and the other of the first audio data receiving device 111 and the second audio data receiving device 112 is a slave device, the master device is configured to determine whether the communication quality between itself and the audio source device meets the preset requirement and whether the communication quality between the slave device and the audio source device meets the preset requirement.

Figure 4:
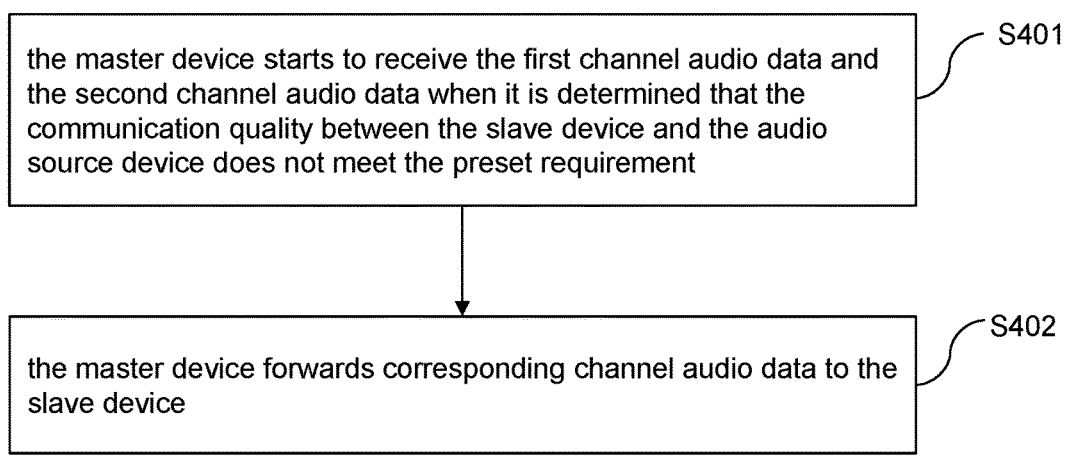
FIG. 4 is a schematic flowchart of the audio data transmission method according to another embodiment of the present invention.

FIG. 4 is a schematic flowchart of the audio data transmission method according to another embodiment of the present invention. As shown in FIG. 4, the audio data transmission method comprises the following operations. At S401, the master device starts to receive the first channel audio data and the second channel audio data when it is determined that the communication quality between the slave device and the audio source device does not meet the preset requirement.

In one embodiment, once the master device finds that the communication quality between the slave device and the audio source device does not meet the preset requirement, the master device actively starts to receive the two channel audio data. In another alternative embodiment, the master device first feeds back the result that the communication quality does not meet the preset requirement to the slave device. When the slave device needs, the slave device sends the first forwarding request to the master device. The master device responds to the first forwarding request sent by the slave device and starts to receive the first channel audio data and the second channel audio data. At S402, the master device forwards corresponding channel audio data to the slave device.

In one embodiment, the slave device sends the second forwarding request to the master device, and the master device forwards the corresponding channel audio data to the slave device in response to the received second forwarding request. In one alternative embodiment, the master device can actively forward the corresponding channel audio data to the slave device. In one embodiment, under the master-slave structure based on the BLE wireless connection, when the first audio data receiving device acts as the master device, the communication quality between the second audio data receiving device and the audio source device will be queried periodically or irregularly through the BLE wireless connection established in advance. If the communication quality between the second audio data receiving device 112 and the audio source device 12 is poor, the first audio data receiving device 111 will actively establish an audio stream transmission link CIS0 with the second audio data receiving device 112, and start to receive the first channel audio data and the second channel audio data.

In one embodiment, the slave device checks whether the data packets are received correctly in each isochronous interval. When a packet loss or error is found, the slave device sends the second forwarding request to the master device and receives the audio data packet forwarded by the master device. In one alternative embodiment, when the master device determines that the communication quality of the slave device does not meet the preset requirement, the master device starts to receive the two channel audio data, and then actively forwards the corresponding channel audio data to the slave device regardless of whether the master device receives the second forwarding request from the slave device or not. The slave device can receive in each ISO interval, or can first check whether there is a packet loss or error in each ISO interval, and then receive when necessary.

The above-mentioned S401 and S402 only describe the situation that the communication quality between the slave device and the audio source device does not meet the preset requirement. During specific implementation, the master device can also regularly or irregularly confirm the communication quality between itself and the audio source device, request the slave device to receive the two channel audio data when the preset requirement is not met, and then obtain the audio data forwarded from the slave device. For the specific technical details in the case of the master-slave structure, please refer to the above-mentioned description of the peer-to-peer structure, which will not be repeated here.

Regardless of whether it is a peer-to-peer structure or a master-slave structure, the forwarding of audio data can be stopped after the communication quality is restored in order to avoid unnecessary occupation of communication resources. The forwarding of audio data may be stopped when it is determined that the communication quality between the audio data receiving device whose communication quality does not meet the preset requirement and the audio source device reaches a preset threshold. The preset threshold may be the same as the preset requirement, or may be different with the preset requirement. In another embodiment, when the forwarding of audio data is stopped, the other audio data receiving device can stop receiving and forwarding corresponding channel audio data of the one audio data receiving device whose is restored to meet the preset requirement now, and the one audio data receiving device can stop sending the second forwarding request. In addition, the wireless connection between the first audio data receiving device and the second audio data receiving device is disconnected, and/or the audio stream transmission link for forwarding the first channel audio data or the second channel audio data is canceled when the forwarding of audio data is stopped.

In the case of the peer-to-peer structure, when it is determined that the communication quality between the audio data receiving device whose communication quality does not meet the preset requirement and the audio source device recovers to meet the preset requirement, or reaches the preset threshold, a stop instruction is sent to the other audio data receiving device, so that the other audio data receiving device switches from receiving the first channel audio data and the second channel audio data to receive one channel audio data. The audio data receiving device with poor communication quality stops sending the second forwarding request to the other audio data receiving device.

In the case of the master-slave structure, when it is determined that the communication quality between the slave device and the audio source device recovers to meet the preset requirement, or reaches the preset threshold, the master device switches from receiving the first channel audio data and the second channel audio data to receive only one channel audio data. In addition, the master device stops actively forwarding the corresponding channel audio data to the slave device, and the slave device stops sending the second forwarding request to the master device.

The audio data transmission method shown in FIG. 2 comprises a plurality of specific embodiments, and the above-mentioned embodiments are only a part of the feasible embodiments. Those skilled in the art can obtain other various embodiments according to the technical concept described above and the relevant embodiments of the present invention, which are not listed one by one in the present invention, but should all fall within the protection scope of the present invention.

It should be noted that the technical solution provided in the present invention is described by taking two-channel audio data receiving devices as an example. Referring to the two-channel audio data receiving devices, multi-channel audio data receiving devices can be obtained correspondingly. In order to further fully understand the audio data transmission method provided according to one embodiment of the present invention, more detailed embodiments are listed below in conjunction with specific application scenarios.

In a first detailed embodiment, a dual channel audio data playback device 11 is a wireless stereo headphone, such as a true wireless headphone. The first audio data receiving device 111 can be a left channel headphone (also called as a left headphone), and the second audio data receiving device 112 is a right channel headphone (also called as a right headphone). Alternatively, the first audio data receiving device 111 can be the right channel headphone, and the second audio data receiving device 112 can be the left channel headphone. Obviously, the dual channel audio data playback device 11 can also be a stereo speaker. At this time, the first audio data receiving device 111 and the second audio data receiving device 112 can be a left channel speaker (also called as a left speaker) and a right channel speaker (also called as a right speaker). Alternatively, the first audio data receiving device 111 and the second audio data receiving device 112 can respectively correspond to the right channel speaker and the left channel speaker.

In the first detailed embodiment, the wireless stereo headphone comprises a left-channel headphone and a right-channel headphone, and a smart TV is used as the audio source device to establish a point-to-multipoint wireless connection with one or more wireless stereo headphones through the BIG, to achieve stereo audio transmission and playback. The left channel headphone equivalent to the first audio data receiving device and the right channel headphone equivalent to the second audio data receiving device of the wireless stereo headphone are wirelessly connected through the BLE wireless connection, and the audio data is forwarded to each other through a CIS link.

FIG. 5 is a BIG-based space diversity timeslot structure provided according to one embodiment of the present invention. The BIG consists of two BISs, including a BIS1 links and a BIS2 link, which correspond to a left channel link and a right channel link respectively. ISO Interval is an isochronous interval under the BIG. That is, the interval between two anchor points of the BIG. In this embodiment, a time length occupied by each timeslot can be set specifically based on corresponding protocol. The value of each timeslot listed below is for example only.

As an exemplary implementation manner, both the BIS1 link and the BIS2 link use BLE 2M PHY, that is, a physical layer with a transmission rate of 2 Mbps, and the ISO interval is set to 20 ms. The timeslots in the ISO Interval comprise a transmission timeslot, one or more retransmission timeslot, a request sub-timeslot, a forwarding sub-timeslot and other timeslots. Solid line boxes T0 and T1 starting from one anchor point represent the transmission timeslots of the BIS1 link and the BIS2 link respectively, which are used by the smart TV to send the left channel audio data and right channel audio data to the left channel headphone and the right channel headphone respectively. It can be understood that the transmission timeslots of the smart TV corresponds to receiving timeslots of the left channel headphone and the right channel headphone. Subsequent dotted boxes T2 and T3 represent the retransmission timeslots of BIS1 and BIS2 respectively, which are used for retransmitting the audio data transmitted in the timeslots T0 and T1 respectively. The retransmission timeslot is a limited number of times. Although only one time of retransmission is shown in FIG. 5, in fact, it can also be several times, such as 2 to 3 times, to improve communication reliability.

For example, each timeslot of the transmission timeslot and the retransmission timeslot of the BIS1 and the BIS2 occupy 1048 us, and the interval between two adjacent timeslots in the transmission timeslot and the retransmission timeslot is 352 us. Thus, each of the intervals between starting points of T1 and T0, between starting points of T2 and T1, and between starting points of T3 and T2 is 1400 us. It is the forwarding timeslot between the left channel headphone and the right channel headphone after the retransmission timeslot T3, the interval between the retransmission timeslot T3 and the forwarding timeslot is 352 us.

As shown in FIG. 5, a point-to-point CIS link, namely CIS0, is established between the left channel headphone and the right channel headphone, and BLE 2M PHY, namely a physical layer with a transmission rate of 2 Mbps, is used. During specific implementation, different CIS links may also be established for forwarding the audio data from the left channel to the right channel and forwarding the audio data from the right channel to the left channel respectively.

The timeslot T4 shown in FIG. 5 is the request sub-timeslot, which is used for the right channel headphone to send the second forwarding request REQ to the left channel headphone. The timeslot CIS0 L→R shown in FIG. 5 is the forwarding sub-timeslot, which is used for the left channel headphone to forward the right channel audio data to the right channel headphone. The timeslot T5 is the next request sub-timeslot, which is used for the left channel headphone to send the second forwarding request REQ to the right channel headphone. The timeslot CIS0 R→L is the next forwarding sub-timeslot, which is used for the right channel headphone to forward the left channel audio data to the left channel headphone.

For example, a packet length of REQ is 52 us, and a packet length sent in CIS0 L→R and CIS0 R→L is 1048 us. Each interval between the request sub-timeslots REQ, and the forwarding sub-timeslots CIS0 L→R and CIS0 R→L is 150 us. The other timeslots in the ISO Interval are used for the smart TV to broadcast synchronization information and control information, for the left channel headphone and the right channel headphone to maintain the BLE wireless connection, and exchange channel quality information.

Generally speaking, the left channel headphone only receives the left channel audio data of the BIS1 link, and the right channel headphone only receives the right channel audio data of the BIS2 link. The left channel headphone and the right channel headphone plays the left and right channel audio signals synchronously according to the BIG protocol. The left and right channel headphones first receive the audio data transmitted in the transmission timeslot T0 and T1 as shown in FIG. 5. If the audio data is confirmed to be received correctly, the audio data retransmitted in the retransmission timeslot T2 or T3 will not be received. Otherwise, the audio data retransmitted in the retransmission timeslot T2 or T3 is continuously received. If the audio data cannot be received correctly in both the transmission timeslot and the retransmission timeslot, a packet loss or error compensation algorithm is used to process the lost audio data to ensure smoothness of audio playback. However, if the probability of packet loss or error is too high, and the audio quality after the packet loss or error compensation will be greatly reduced.

In one embodiment of the present invention, when the left and right channel headphones respectively receive corresponding channel audio data through the BIS1 link and the BIS2 link, and the signal strength of the received audio data is estimated. When it is determined that the communication quality of one channel is poor and cannot meet the preset requirement for receiving the audio data normally, the one channel with poor communication quality will request the other channel to enter the forwarding state. In one alternative embodiment, one channel actively queries the communication quality of the other channel, and when it is found that the communication quality of the other channel is poor, the one channel actively enters the forwarding state, and forwards corresponding channel audio data to the other channel.

For example, when the left and right channel headphones are in the peer-to-peer structure, a BLE wireless connection is established between the left channel headphone and the right channel headphone. If the signal strength of the audio data received by one of the left and right channel headphones is lower than the first threshold, for example, lower than −90 dBm, the first forwarding request is sent to the other channel headphone. After the other channel headphone receives the first forwarding request, it starts to receive the left and right channel audio data in the two timeslots corresponding to the BIS1 link and the BIS2 link respectively, and establishes the CIS0 link between the left and right channel headphones to forward the audio data having not received correctly.

When the left and right channel headphones are in the master-slave structure, the left channel headphone regularly queries the signal strength of the audio data received by the right channel headphone. A regular query interval can be 0.1-10 s, such as 1 s, which is determined according to the actual situation. When the left channel headphone determines that the communication quality of the right channel cannot meet the preset requirement, it actively establishes the CIS0 link, receive the two channel audio data, and forward the right channel audio data to the right channel headphone. Alternatively, the left channel headphone can also send the query result to the right channel headphone, and the right channel headphone sends the first forwarding request to the left channel headphone after receiving the query result.

In one embodiment, the left channel headphone and the right channel headphone periodically query the communication quality of their respective channel. A periodic query interval can be 1 s. Next, if the signal strength of the received audio data of one of the left and right channel headphones is lower than the first threshold, for example, if the right channel headphones are lower than −90 dBm, the right channel headphone first request to establish a BLE wireless connection with the left channel headphone. After the BLE wireless connection is established, the right channel headphone sends the first forwarding request to the left channel headphone. After the left channel headphone receives the first forwarding request, it starts to receive the left channel audio data through the BIS1 link and the right channel audio data through the BIS2 link, and establishes the CIS0 link between the left and right channel headphones for forwarding the right channel audio data to the right channel headphone.

It can be known to those of ordinary skill in the art that, as members of the same BIG, one of the left headphone and the right headphone can obtain a link parameter or a communication parameter between the other of the left headphone and the right headphone and the audio source device according to the BIG protocol, so that the audio data that the other of the left headphone and the right headphone should receive can be received from the audio source device based on the link parameter or communication parameter by the one of the left headphone and the right headphone. In one alternative embodiment, the first forwarding request can also comprise the link parameter or the communication parameter, so that a receiver of the first forwarding request can receive audio data from the audio source device based on the link parameter or communication parameter.

If the signal strength of the audio data received by the right channel headphone is lower than −90 dBm, the control command REQ is sent in the timeslot T4. If the left channel headphone correctly receives the right channel audio data of the BIS2 link in the timeslot T1 or T3, it will forward the right channel audio data to the right channel headphone. Otherwise, the left channel headphone will reply an empty packet to the right channel headphone. If the signal strength of the audio data received by the left channel headphone is lower than −90 dBm, the control command REQ is sent in the timeslot T5. If the right channel headphone correctly receives the left channel audio data of the BIS1 link in the time slot T0 or T2, it will forward the left channel audio data to the left channel headphone. Otherwise, the right channel headphone will forward the empty packet to the left channel headphone.

If both the left and right channel headphones do not receive audio data correctly in the transmission timeslot, the retransmission timeslot and the forwarding timeslot in one ISO interval of the BIG, the packet loss or error compensation algorithm is used to process the lost audio data to ensure the smoothness of audio playback. When the signal strength of the audio data received by one headphone returns to normal, that is, when the signal strength of the audio data received by the one headphone is greater than a second threshold (e.g. −80 dBm), the forwarding of audio data can be stopped. For example, a control command to stop the forwarding of audio data is sent to the other headphone, and the CIS0 link is cancelled. The values of the first threshold value and the second threshold value can be specifically set by those skilled in the art according to the technical solutions of the present invention. For example, a value range of the first threshold value is −85 dBm~−95 dBm, and a value range of the second threshold value is −75 dBm~−85 dBm.

In a second detailed embodiment, the wireless stereo headphone is still used as an example of the stereo audio data receiving device, and each wireless stereo headphone comprises a left channel headphone and a right channel headphone. A smartphone are used as the audio source device. The smartphone establishes a point-to-point wireless connection with the wireless stereo headphones through the CIG to realize stereo audio transmission and playback. The left channel headphone and the right channel headphone of the wireless stereo headphone are wirelessly connected through a BLE wireless connection, and the audio data is forwarded through a CIS link established between the left channel headphone and the right channel headphone.

FIG. 6 is a CIG-based space diversity timeslot structure provided according to one embodiment of the present invention. As shown in FIG. 6, the CIG consists of two CISs, including a CIS1 link and a CIS2 link, which correspond to correspond to the left channel link and the right channel link respectively. The ISO Interval is an isochronous interval under the CIG, that is, the interval between two CIG anchor points.

As an exemplary implementation manner, both the CIS1 link and the CIS2 link use BLE 2M PHY, that is, a physical layer with a transmission rate of 2 Mbps, and the ISO interval is set to 20 ms. The timeslots in the ISO Interval comprise a transmission timeslot, one or more retransmission timeslot, a request sub-timeslot, a forwarding sub-timeslot and other timeslots.

Solid line boxes T0 and T1 shown in FIG. 6 starting from one anchor point represent the transmission timeslots of the CIS1 link and the CIS2 link respectively, which are used for the smartphone to send the left and right channel audio data to the left and right channel headphones respectively. Solid line box ACK represents the timeslot for the left and right channel devices to reply confirmation information about whether the audio data was received correctly to the smartphone. Following dotted boxes T2 and T3 respectively represent the retransmission timeslots of the CIS1 link and the CIS2 and the following solid line box ACK represents the timeslot for receiving corresponding confirmation information. The dotted boxes T2 and T3 are used to retransmit the same audio data as the transmission timeslots of the CIS1 link and the CIS2.

For example, each timeslot of the transmission timeslot and the retransmission timeslot of the CIS1 link and the CIS2 occupies 1048 us, each of ACKs occupies 52 us, and the interval between the ACK and each one of the transmission and retransmission timeslots is 150 us. The ACK of the retransmission timeslot T3 is followed by the forwarding timeslot between the left and right channel headphones. The interval between the ACK of the retransmission timeslot T3 and the forwarding timeslot of the left and right channel headphones is 150 us.

As shown in FIG. 5, a point-to-point CIS link, namely CIS0, is established between the left channel headphone and the right channel headphone, and BLE 2M PHY, namely a physical layer with a transmission rate of 2 Mbps, is used. The timeslot T4 shown in FIG. 6 is the request sub-timeslot, which is used for the right channel headphone to send the second forwarding request REQ to the left channel headphone, and the timeslot CIS0 L→R shown in FIG. 6 is the forwarding sub-timeslot, which is used for the left channel headphone to forward the right channel audio data to the right channel headphone. The timeslot T5 is the next request sub-timeslot, which is used for the left channel headphone to send the second forwarding request REQ to the right channel headphone. The timeslot CIS0 R→L is the next forwarding sub-timeslot, which is used for the right channel headphone to forward the left channel audio data to the left channel headphone. A packet length of REQ is 52 us, and a packet length sent in CIS0 L→R and CIS0 R→L is 1048 us. Each interval between the request sub-timeslots REQ, and the forwarding sub-timeslots CIS0 L→R and CIS0 R→L is 150 us. The other timeslots in the ISO Interval are used for the smartphone to broadcast synchronization information and control information, for the left channel headphone and the right channel headphone to maintain the BLE wireless connection, and exchange channel quality information.

Generally speaking, the left channel headphone only receives the left channel audio data of the CIS1 link, and the right channel headphone only receives the right channel audio data of the CIS2 link. The left channel headphone and the right channel headphone plays the left and right channel audio signals synchronously according to the CIG protocol. The left and right channel headphones first receive the audio data transmitted in the transmission timeslot T0 and T1 as shown in FIG. 6. If the audio data is confirmed to be received correctly, ACK is returned and the audio data retransmitted in the retransmission timeslot T2 or T3 will not be received. Otherwise, NCK is returned and the audio data retransmitted in the retransmission timeslot T2 or T3 is continuously received. If the audio data cannot be received correctly in both the transmission timeslot and the retransmission timeslot, a packet loss or error compensation algorithm is used to process the lost audio data to ensure smoothness of audio playback. However, if the probability of packet loss or error is too high, and the audio quality after the packet loss or error compensation will be greatly reduced.

When the left and right channel headphones respectively receive corresponding channel audio data through the BIS1 link and the BIS2 link, and the signal strength of the received audio data is estimated. Like the first detailed embodiment, the forwarding of audio data can be realized in two ways. For example, when the left and right channel headphones are in the master-slave structure, the left channel headphone periodically queries the signal strength of the audio data received by the right channel headphone through the BLE wireless connection established between the left and right channel headphones. When the left channel headphone determines that the communication quality of the right channel is lower than the first threshold, for example, lower than −90 dBm, the left channel headphone establishes the CIS0 link, receives the two channel audio data of the CIS1 link and the CIS2 link, and forwards the right channel audio data to the right channel headphone.

For another example, when the left and right channel headphones are in the peer-to-peer structure, the left channel headphone and the right channel headphone periodically query the communication quality of their respective channel. If the signal strength of the audio data received by the left channel headphone is lower than the first threshold, for example, lower than −90 dBm, the left channel headphone first request to establish the BLE wireless connection with the right channel headphones. After the BLE wireless connection is established, the left channel headphone sends the first forwarding request to the right channel headphone. After the right channel headphone receives the first forwarding request, it starts to receive the left channel audio data through the CIS1 link and the right channel audio data through the CIS2 link, and establishes the CIS0 link between the left and right channel headphones for forwarding the left channel audio data to the left channel headphone.

It can be known to those of ordinary skill in the art that, as members of the same CIG, one of the left headphone and the right headphone can obtain a link parameter or a communication parameter between the other of the left headphone and the right headphone and the audio source device according to the CIG protocol, so that the audio data that the other of the left headphone and the right headphone should receive can be received from the audio source device based on the link parameter or communication parameter by the one of the left headphone and the right headphone. In one alternative embodiment, the first forwarding request can also comprise the link parameter or the communication parameter, so that a receiver of the first forwarding request can receive audio data from the audio source device based on the link parameter or communication parameter.

If the signal strength of the audio data received by the right channel headphone is lower than −90 dBm, the control command REQ is sent in the timeslot T4. If the left channel headphone correctly receives the right channel audio data of the CIS2 link in the timeslot T1 or T3, it will forward the right channel audio data to the right channel headphone, otherwise, it will reply an empty packet to the right channel headphone. If the signal strength of the audio data received by the left channel headphone is lower than −90 dBm, the control command REQ is sent in the timeslot T5. If the right channel headphone correctly receives the left channel audio data of the CIS1 links in the timeslot T0 or T2, it will forward the left channel audio data to the left channel headphone, otherwise, it will forward the empty packet to the left channel headphone.

If the left and right channel headphones do not receive audio data correctly in the transmission timeslot, the retransmission timeslot and the forwarding timeslot in one ISO interval of the CIG, the packet loss or error compensation algorithm is used to process the lost audio data to ensure the smoothness of audio playback.

When the signal strength of the audio data received by one headphone returns to normal, that is, when the signal strength of the audio data received by one headphone is greater than the second threshold (e.g. −80 dBm), the forwarding of audio data can be stopped, for example, a control command to stop the forwarding of audio data is sent to the other headphone, and the CIS0 link is cancelled.

In the foregoing two detailed embodiments, the first audio data receiving device 111 and the second audio data receiving device 112 use a wireless communication to forward audio data. A detailed embodiment to be given below is different from the foregoing detailed embodiments in that the first audio data receiving device 111 and the second audio data receiving device 112 use a wired communication to forward audio data. The first audio data receiving device 111 and the second audio data receiving device 112 can be connected by a wired connection such as a Universal Asynchronous Receiver/Transmitter (UART) or a Serial Peripheral Interface (SPI). When the communication quality between the audio source device and one of the first audio data receiving device 111 and the second audio data receiving device 112 does not meet the preset requirement, the other of the first audio data receiving device 111 and the second audio data receiving device 112 starts to receive the first channel audio data and the second channel audio data, and forwards corresponding channel audio data to the audio data receiving device whose communication quality does not meet the preset requirement.

In the detailed embodiment, after the other of the first audio data receiving device 111 and the second audio data receiving device 112 starts to receive the first channel audio data and the second channel audio data, the audio data transmission method further comprises: the other audio data receiving device detects whether corresponding channel audio data is correctly received and outputs an indication information about whether the corresponding channel audio data is correctly received through the wired connection after the other audio data receiving device completes receipt of the corresponding channel audio data of the one audio data receiving device whose communication quality does not meet the preset requirement every time.

The audio data transmission method further comprises: the one audio data receiving device whose communication quality does not meet the preset requirement detects whether the corresponding channel audio data is correctly received and outputs an indication information about whether the corresponding channel audio data is correctly received after the one audio data receiving device whose communication quality does not meet the preset requirement completes receipt of the corresponding channel audio data every time.

The audio data receiving device whose communication quality does not meet the preset requirements inquires the indication information about whether the other audio data receiving device receives correctly through the wired connection. When at least one of the first audio data receiving device and the second audio data receiving device receives correctly, receiving of the audio data that should be received this time and is retransmitted by the audio source device is stopped, or the confirmation information that has correctly received this time is replied.

The other audio data receiving device inquires the indication information of whether the one audio data receiving device receives correctly through the wired connection, when at least one of the first audio data receiving device and the second audio data receiving device receives correctly, receiving of the audio data that should be received this time and is retransmitted by the audio source device is stopped, or the confirmation information that has correctly received this time is replied.

The one audio data receiving device whose communication quality does not meet the preset requirement inquires the indication information of whether the other audio data receiving device receives correctly through the wired connection, when itself does not receive correctly and the other audio data receiving device receives correctly, the one audio data receiving device receives the audio data that should be received this time and is forwarded by the other audio data receiving device. The other audio data receiving device inquires whether the one audio data receiving device receives correctly through the wired connection, when the other audio data receiving device receives correctly and the one audio data receiving device whose communication quality does not meet the preset requirement does not receive correctly, the other audio data receiving device forwards the audio data that should be received by the one audio data receiving device whose communication quality does not meet the preset requirement this time.

In the third detailed embodiment of the present invention, the dual channel audio data playback device 11 is a wireless headworn stereo headphone for example, the first audio data receiving device 111 can be a left speaker of the headworn stereo headset, and the second audio data receiving device 112 is a right speaker of the headworn stereo headset. Alternatively, the first audio data receiving device can be the right speaker, and the second audio data receiving device is the left speaker.

Similar to the previous embodiments, the left speaker and the right speaker communicate with the audio source device, such as a smartphone, based on the BLE wireless communication protocol respectively, so as to receive the left channel audio data from the smartphone based on the BIS1 link, and the right channel audio data from the smartphone based on the BIS2 link. Wired communication is also achieved between the left speaker and the right speaker through a wired connection such as a Universal Asynchronous Receiver/Transmitter (UART) or a Serial Peripheral Interface (SPI). The space diversity timeslot structure based on the BIG link of the left and right speakers and the smartphone can be referred to as shown in FIG. 5, which will not be repeated here.

In one embodiment, the left speaker and the right speaker adopt a peer-to-peer structure. When it is determined that the communication quality between one of the left and right speakers, such as the right speaker, and the smartphone does not meet the preset requirement, the right speaker sends a first forwarding request to the left speaker through the SPI interface. In response to the first forwarding request, the left speaker starts to receive the left channel audio data and the right channel audio data.

After the right speaker successfully receives corresponding channel audio data each time, that is, the right channel audio data, it detects whether the right channel audio data is correctly received, and outputs the indication information about whether the right channel audio data is correctly received through the wired connection. After the left speaker successfully receives the right channel audio data each time, it detects whether the right channel audio data is correctly received, and outputs the indication information about whether the right channel audio data is correctly received through the wired connection.

The right speaker queries the indication information about whether the left speaker correctly receives though the wired connection. When the right speaker does not receive correctly itself and the left speaker receives correctly, the right speaker receives the audio data that should be received this time and is forwarded by the left speaker. When at least one of the right speaker and the left speaker correctly receives, the right speaker stops receiving the right channel audio data that should be received this time and retransmitted by the audio source device, or replies to the audio source device to confirm that the right channel audio data has been correctly received this time. When the right speaker receives correctly, it will not receive the audio data forwarded by the left speaker, and will reply to the audio source device to confirm that the right channel audio data has been correctly received this time.

The left speaker queries whether the right speaker receives correctly through the wired connection. When the left speaker receives correctly and the right speaker does not receive correctly, the left speaker forwards the right channel audio data that the right speaker should receive this time. When at least one of the left speaker and the right speaker receives correctly, the left speaker stops receiving the right channel audio data retransmitted by the audio source device, and when the left speaker does not receive correctly, it does not forward audio data or send an empty packet.

In other specific embodiments, when the right speaker does not receive correctly, it can also send a second forwarding request to the left speaker through the wired connection. When the left speaker has received correctly, it forwards the right channel audio data that should be received this time in response to the second forwarding request. When the left speaker does not receive correctly, it sends the empty packet in response to the second forwarding request.

It can be understood that, in this embodiment, when the communication quality of the left speaker does not meet the preset requirement, the audio data transmission method is the same as the aforementioned right speaker. In addition, for the embodiments that the left and right speakers are in the master-slave structure, or the left and right speakers communicate with the audio source device based on the CIG link and the space diversity time slot structure shown in FIG. 6, please refer to the foregoing embodiments in the present invention, which will not be repeated here.

Based on the same inventive concept, an audio data transmission method is provided according to one embodiment of the present invention. FIG. 7 is a schematic flowchart of the audio data transmission method according to still another embodiment of the present invention. As shown in FIG. 7, the audio data transmission method comprises the following operations.

At S701, the audio source device instructs the other of the first audio data receiving device and the second audio data receiving device to start receiving the first audio channel audio data and the second channel audio data when the audio source device determines that the communication quality between one of the first audio data receiving device and the second audio data receiving device and itself does not meet a preset requirement.

In one embodiment, the audio source device may send a first forwarding request to the other of the first audio data receiving device and the second audio data receiving device.

At S702, the audio source device notifies the other of the first audio data receiving device and the second audio data receiving device to forward corresponding channel audio data to the one audio data receiving device whose communication quality does not meet the preset requirement.

In one embodiment, the audio source device may send a second forwarding request to the other of the first audio data receiving device and the second audio data receiving device, so that the other of the first audio data receiving device and the second audio data receiving device starts to forward. It can be understood that, the second forwarding request may also be sent by the one audio data receiving device with poor communication quality.

For other technical details of the audio data transmission method in this embodiment, please refer to the foregoing embodiments in the present invention, which will not be repeated here.

Figure 8:
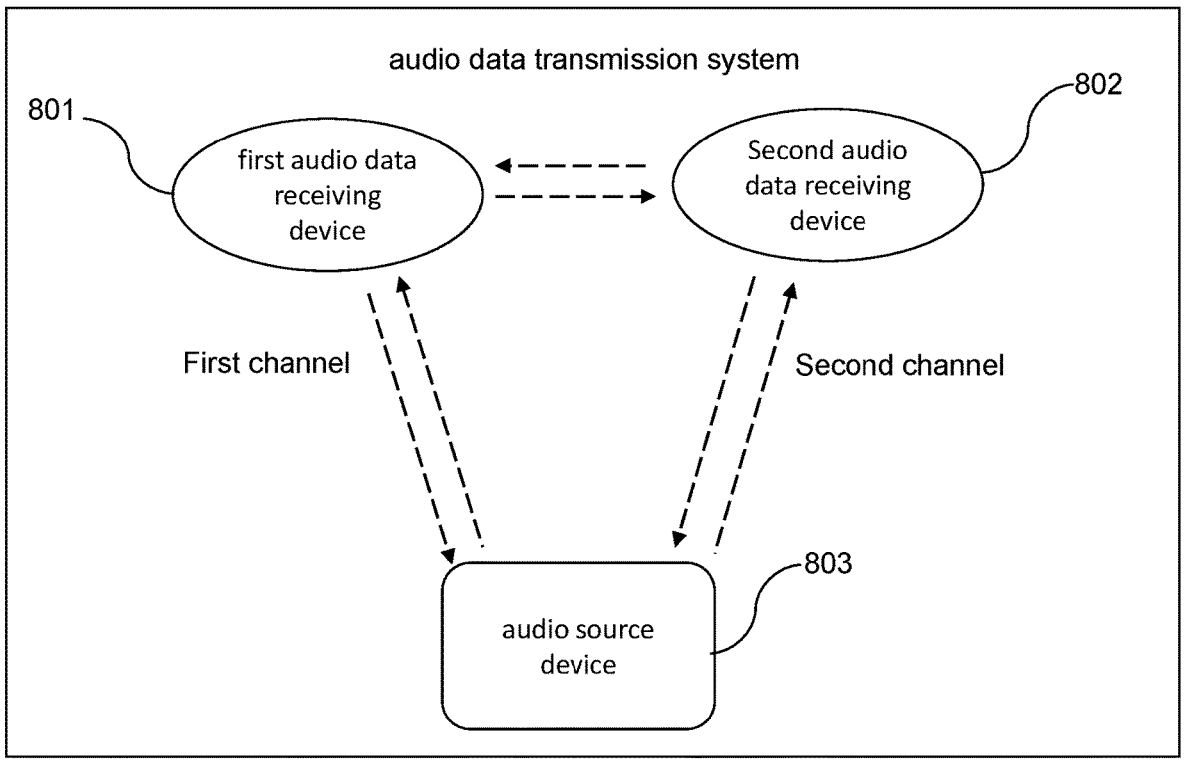
FIG. 8 is a schematic diagram of an audio data transmission system according to one embodiment of the present invention.

Based on the same inventive concept, an audio data transmission system is provided according to one embodiment of the present invention. FIG. 8 is a schematic diagram of the audio data transmission system according to one embodiment of the present invention. As shown in FIG. 8, the audio data transmission system comprises a first audio data receiving device 801, a second audio data receiving device 802 and an audio source device 803.

The first audio data receiving device 801 receives a first channel audio data from the audio source device 803 based on a wireless communication protocol. The second audio data receiving device 802 receives a second channel audio data from the audio source device 803 based on the wireless communication protocol.

The other of the first audio data receiving device 801 and the second audio data receiving device 802 starts to receive the first channel audio data and the second channel audio data when a communication quality between the audio source device 803 and one of the first audio data receiving device 801 and the second audio data receiving device 802 does not meet a preset requirement, and further forwards corresponding channel audio data to the one of the first audio data receiving device and the second audio data receiving device whose communication quality does not meet the preset requirement.

For other technical details of the audio data transmission system in this embodiment, please refer to the foregoing embodiments in the present invention, which will not be repeated here.

Figure 9:
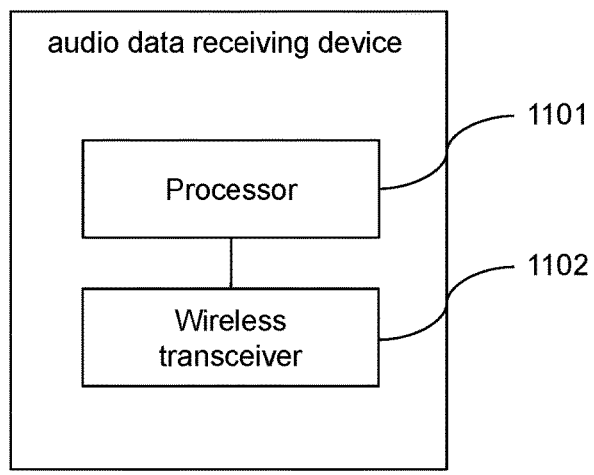
FIG. 9 is a schematic structural diagram of an audio data receiving device according to one embodiment of the present invention.

Based on the same inventive concept, an audio data receiving device is provided according to one embodiment of the present invention. FIG. 9 is a schematic structural diagram of the audio data receiving device according to one embodiment of the present invention. The audio data receiving device can be the first audio data receiving device or the second audio data receiving device. The first audio data receiving device receives a first channel audio data from the audio source device based on a wireless communication protocol. The second audio data receiving device receives a second channel audio data from the audio source device based on the wireless communication protocol.

The audio data receiving device comprises a processor 1101 and a wireless transceiver 1102.

The processor 1101 is configured to instruct the other audio data receiving device to start to receive the first channel audio data and the second channel audio data through the wireless transceiver 102 when it is determined that the communication quality between one of the first audio data receiving device and the second audio data receiving device and the audio source device does not meet the preset requirement.

The wireless transceiver module 1102 receives corresponding channel audio data forwarded by the other audio data receiving device.

For other technical details of the audio data receiving device in this embodiment, please refer to the foregoing embodiments in the present invention, which will not be repeated here.

Based on the same inventive concept, an audio data receiving device is provided according to one embodiment of the present invention. The audio data receiving device comprises a wireless transceiver and a processor.

The wireless transceiver is configured for receiving a first channel audio data from an audio source device based on a wireless communication protocol.

The processor is configured to control the wireless transceiver to start to receive the first channel audio data and a second channel audio data corresponding to a second channel audio data when a communication quality between the second audio data receiving device and the audio source device does not meet a preset requirement, and further control the wireless transceiver to forward the second channel audio data to the second audio data receiving device In one embodiment, the wireless transceiver is further configured to establish a wireless communication connection with the second audio data receiving device.

In one embodiment, the wireless transceiver is further configured to establish an audio stream transmission link between the first audio data receiving device and the second audio data receiving device for forwarding the first channel audio data or the second channel audio data.

In one embodiment, the processor is also configured to control the wireless transceiver to receive the first channel audio data forwarded by the second audio data receiving device when the communication quality between the present audio data receiving device and the audio source device does not meet the preset requirement.

In one embodiment, the audio data receiving device has at least two receiving states. The processor is used to switch the audio data receiving device from the first receiving state to the second receiving state when the communication quality between one of the present audio data receiving device and the second audio data receiving device and the audio source device does not meet the preset requirement.

In the first receiving state, the wireless transceiver is configured to receive the first channel audio data from the audio source device. In the second receiving state, the audio data receiving device implements at least one of two functions of receiving the first channel audio data forwarded from outside and forwarding the second channel audio data to the outside.

The receiving the first channel audio data forwarded from outside comprises controlling the wireless transceiver to receive the first channel audio data forwarded by the second audio data receiving device when it is determined that the communication quality between the present audio data receiving device and the audio source device does not meet the preset requirement. During specific implementation, the wireless transceiver may also be controlled to send the first forwarding request and/or the second forwarding request to the second audio data receiving device.

The forwarding the second channel audio data to the outside comprises controlling the wireless transceiver to receive the first channel audio data and the second channel audio data when it is determined that the communication quality between the second audio data receiving device and the audio source device does not meet the preset requirement audio data, and forward the second channel audio data. During specific implementation, the wireless transceiver module may also be controlled to receive the first forwarding request and/or the second forwarding request.

In this embodiment, the processor is further configured to switch the audio data receiving device from the second receiving state to the first receiving device when the communication quality between the device and/or the second audio data receiving device and the audio source device reaches a preset threshold.

Optionally, the audio data receiving device can also comprise an audio output module for playing audio data and realizing the audio playback function. Based on the same inventive concept, an audio data receiving device is provided according to one embodiment of the present invention. The audio data receiving device comprises a wireless transceiver and a processor. The wireless transceiver module is configured for receiving the second channel audio data from the audio source device based on the wireless communication protocol.

The processor is configured to control the audio data receiving device to start receiving the second channel audio data forwarded by the first audio data receiving device when the communication quality between the audio data receiving device and the audio source device does not meet the preset requirement. In one embodiment, the wireless transceiver is further configured to establish a wireless communication connection with the first audio data receiving device. In one embodiment, the wireless transceiver is further configured to establish an audio stream transmission link between the first audio data receiving device and the second audio data receiving device for forwarding the first channel audio data or the second channel audio data.

In one embodiment, the audio data receiving device has at least two receiving states. The processor is configured to switch the audio data receiving device from the first receiving state to the second receiving state when the communication quality between the present audio data receiving device and the audio source device does not meet the preset requirement.

In the first receiving state, the wireless transceiver is configured to receive the second channel audio data from the audio source device. In the second receiving state, the processor is further configured to control the wireless transceiver to receive the second channel audio data forwarded by the first audio data receiving device based on the audio stream transmission link.

In this embodiment, the processor is further configured to switch the audio data receiving device from the second receiving state to the first receiving device when the communication quality between the present audio data receiving device and the audio source device reaches the preset threshold. Optionally, the audio data receiving device can also comprise an audio output module for playing audio data and realizing the audio playback function.

Based on the same inventive concept, an audio data receiving device is provided according to one embodiment of the present invention. The audio data receiving device comprises a wireless transceiver, a wired transceiver and a processor. The wireless transceiver is configured for receiving a first channel audio data from an audio source device based on a wireless communication protocol. The processor is configured to control the wireless transceiver to start to receive the first channel audio data and a second channel audio data corresponding to a second audio data receiving device when a communication quality between the second audio data receiving device and the audio source device does not meet a preset requirement, and further control the wired transceiver to forward the second channel audio data to the second audio data receiving device.

In one embodiment, the processor is also configured to control the wired transceiver to receive the first channel audio data forwarded by the second audio data receiving device when the communication quality between the audio data receiving device and the audio source device does not meet the preset requirement. In one embodiment, the audio data receiving device has at least two receiving states. The processor is used to switch the audio data receiving device from the first receiving state to the second receiving state when the communication quality between one of the audio data receiving device and the second audio data receiving device and the audio source device does not meet the preset requirement.

In the first receiving state, the wireless transceiver is configured to receive the first channel audio data from the audio source device. In the second receiving state, the audio data receiving device implements at least one of two functions of receiving the first channel audio data forwarded from outside and forwarding the second channel audio data to the outside.

The receiving the first channel audio data forwarded from outside comprises controlling the wired transceiver to receive the first channel audio data forwarded by the second audio data receiving device when it is determined that the communication quality between the present audio data receiving device and the audio source device does not meet the preset requirement. During specific implementation, the wired transceiver may also be controlled to send the first forwarding request to the second audio data receiving device and/or query the indication information about whether the second audio data receiving device correctly receives output by the second audio data receiving device.

The forwarding the second channel audio data to the outside comprises controlling the wireless transceiver to receive the first channel audio data and the second channel audio data when it is determined that the communication quality between the second audio data receiving device and the audio source device does not meet the preset requirement audio data, and controlling the wired transceiver to forward the second channel audio data. During specific implementation, the wireless transceiver may also be controlled to receive the first forwarding request and/or output the indication information about whether the audio data receiving device correctly receives.

In this embodiment, the processor is further configured to switch the audio data receiving device from the second receiving state to the first receiving device when the communication quality between the device and/or the second audio data receiving device and the audio source device reaches the preset threshold. Optionally, the audio data receiving device can also comprise an audio output module for playing audio data and realizing the audio playback function.

Based on the same inventive concept, an audio data receiving device is provided according to one embodiment of the present invention. The audio data receiving device comprises a wireless transceiver, a wired transceiver and a processor. The wireless transceiver module is configured for receiving the second channel audio data from the audio source device based on the wireless communication protocol.

The processor is configured to control the wired transceiver to start receiving the second channel audio data forwarded by the first audio data receiving device when the communication quality between the audio data receiving device and the audio source device does not meet the preset requirement.

In one embodiment, the audio data receiving device has at least two receiving states. The processor is configured to switch the audio data receiving device from the first receiving state to the second receiving state when the communication quality between the audio data receiving device and the audio source device does not meet the preset requirement.

In the first receiving state, the wireless transceiver is configured to receive the second channel audio data from the audio source device. In the second receiving state, the processor is further configured to control the wired transceiver to receive the second channel audio data forwarded by the first audio data receiving device based on the wired connection.

In this embodiment, the processor is further configured to switch the audio data receiving device from the second receiving state to the first receiving device when the communication quality between the present audio data receiving device and the audio source device reaches a preset threshold. Optionally, the audio data receiving device can also comprise an audio output module for playing audio data and realizing the audio playback function. For other technical details of the audio data receiving device in this embodiment, please refer to the foregoing embodiments in the present invention, which will not be repeated here.

In the present invention, each audio data receiving device evaluates the channel quality between itself and the audio source device during the communication with the audio source device. The channel quality is measured by the received signal strength RSSI, or the error rate of the received audio data. When the channel quality between one audio data receiving device and the audio source device is lower than the preset threshold, for example, when the RSSI is lower than a certain threshold, or the error rate is higher than a certain threshold, the first audio data receiving device and the second audio data receiving device establish a BLE wireless connection therebetween, or negotiate to start a forwarding mechanism based on the established BLE wireless connection, or negotiate to start a forwarding mechanism based on a wired connection therebetween. If the first audio data receiving device does not correctly receive the left channel audio data, and the second audio data receiving device correctly receives the left channel audio data, the second audio data receiving device will forward the correctly received left channel audio data to the first audio data receiving device. If the second audio data receiving device does not correctly receive the right channel audio data, but the first audio data receiving device correctly receives the right channel audio data, the first audio data receiving device forwards the correctly received right channel audio data to the second audio data receiving device.

In the present invention, in the case of long distance or occlusion, the audio data receiving device corresponding to one channel receives and forwards the audio data required by the other channel. In this way, by making full use of the independent characteristics of fading at different spatial positions, the probability that two channels cannot correctly receive audio data at the same time is relatively small, so the reliability of wireless communication is improved through spatial diversity gain.

An embodiment of the present invention further provides a computer-readable storage medium, where a computer program is stored on the computer-readable storage medium, and when the computer program is executed by a processor, each process of the above-mentioned embodiment of the audio transmission method is implemented, and can achieve the same technical effect, in order to avoid repetition, it is not repeated here. The computer-readable storage medium is, for example, a read-only memory (Read-Only Memory, ROM), a random access memory (Random Access Memory, RAM), a magnetic disk, or an optical disk.

A computer-readable storage medium storing a program executed by a processor is provided according to one embodiment of the present invention. The program is executed by the processor to cause the processor to perform the above-mentioned audio data forwarding method. In order to avoid repetition, details are not repeated here. The computer-readable storage medium can be, for example, read only memory (ROM), random access memory (RAM), magnetic disc or optical disc.

The present invention is described with reference to methods, equipment (systems), and flow charts and/or block diagrams of computer program products according to the embodiment of the present invention. It should be understood that each flow and/or block in a flowchart and/or block diagram, as well as the combination of flow and/or block in a flowchart and/or block diagram, can be implemented by computer program instructions. These computer program instructions may be provided to a processor of a general purpose computer, a dedicated computer, an embedded processor, or other programmable data processing device to produce a machine such that instructions executed by a processor of a computer or other programmable data processing device produce instructions for implementing a flow chart or more. A device for processes and/or block diagrams or functions specified in a box or multiple boxes.

Although preferred embodiments of the present invention have been described, additional changes and modifications to these embodiments may be made once the basic creative concepts are known to those skilled in the art. The appended claims are therefore intended to be interpreted to comprise preferred embodiments and all changes and modifications falling within the scope of this application.

Obviously, a person skilled in the art may make various changes and variations to the application without departing from the spirit and scope of the application. Thus, if these modifications and variations of this application fall within the scope of the claims and their equivalent technologies, the application is also intended to comprise these changes and variations.

What is claimed is:

1. An audio data transmission method comprising:
receiving first channel audio data from an audio source device based on a wireless communication protocol by a first audio data receiving device;
receiving second audio channel audio data from the audio source device based on the wireless communication protocol by a second audio data receiving device;
starting to receive the first channel audio data and the second channel audio data by one of the first and second audio data receiving devices when a communication quality between the audio source device and other one of the first and second audio data receiving devices fails to meet a preset requirement; and
forwarding the first or second channel audio data from the one of the first and second audio data receiving devices to the other one of the first and second audio data receiving device,
wherein the wireless communication protocol is a Bluetooth low energy communication protocol, the first audio data receiving device and the second audio data receiving device communicate with the audio source device respectively based on a space diversity timeslot structure of a broadcast isochronous group or a connected isochronous group, and each isochronous interval in the space diversity timeslot structure comprises a receiving timeslot and one or more retransmission timeslot for receiving the first channel audio data and/or the second channel audio data from the audio source device, and also comprises a forwarding timeslot for forwarding audio data between the first audio data receiving device and the second audio data receiving device.

2. The audio data transmission method according to claim 1, further comprising: detecting the communication quality between the audio source device and the first or second audio data receiving device; and
determining whether the communication quality meets the preset requirement.

3. The audio data transmission method according to claim 2, wherein when a signal strength of a radio frequency signal received by the first audio data receiving device or the second audio data receiving device from the audio source device is lower than a preset first threshold value, or an error rate of audio data received by the first audio data receiving device or the second audio data receiving device is higher than a preset error rate threshold value, the communication quality fails to meet the preset requirement.

4. The audio data transmission according to claim 2, wherein said starting to receive the first channel audio data and the second channel audio data by one of the first and second audio data receiving devices comprises: receiving a first forwarding request to receive the first channel audio data and the second channel audio data in response to the first forwarding request.

5. The audio data transmission method according to claim 1, wherein, before forwarding the first or second channel audio data from the one of the first and second audio data receiving devices to the other one of the first and second audio data receiving device, the audio data transmission method further comprises: sending a second forwarding request to either one of the first audio data receiving device and the second audio data receiving device, wherein the other of the first audio data receiving device and the second audio data receiving device forwards corresponding channel audio data to the one of the first audio data receiving device and the second audio data receiving device according to the second forwarding request.

6. The audio data transmission method according to claim 1, further comprising: establishing a wireless communication connection between the first and second audio data receiving devices; and
establishing an audio stream transmission link between the first and second audio data receiving devices for forwarding the first channel audio data or the second channel audio data when the communication quality fails to meet the preset requirement.

7. The audio data transmission method according to claim 6, wherein the wireless communication connection between the first and second audio data receiving devices is established in advance; or the wireless communication connection between is establish between the first and second audio data receiving devices when the communication quality fails to meet the preset requirement.

8. The audio data transmission method according to claim 6, wherein the wireless communication connection is a Bluetooth Low Energy connection, and the audio stream transmission link comprises a CIS link based on a Bluetooth low energy communication protocol.

9. The audio data transmission method according to claim 6, wherein, after the communication quality between the audio source device and the one of the first audio data receiving device and the second audio data receiving device is determined to have failed the preset requirement, the audio data transmission method further comprises:
detecting whether the communication quality between the audio source device and the one of the first audio data receiving device and the second audio data receiving device whose communication quality does not meet the preset requirement reaches a preset threshold; and
disconnecting the wireless communication connection between the first audio data receiving device and the second audio data receiving device, and/or canceling the audio stream transmission link for forwarding the first channel audio data or the second channel audio data when the preset threshold is reached.

10. The audio data transmission method according claim 1, wherein the first audio data receiving device communicates with the second audio data receiving device based on a wired connection.

11. The audio data transmission method according to claim 10, wherein after the starting to receive the first channel audio data and the second channel audio data by the other of the first audio data receiving device and the second audio data receiving device, the audio data transmission method further comprises:
detecting whether corresponding channel audio data is correctly received and outputting an indication information about whether the corresponding channel audio data is correctly received through the wired connection after the one audio data receiving device whose communication quality does not meet the preset requirement completes receipt of corresponding channel audio data every time;
detecting whether corresponding channel audio data is correctly received and outputting an indication information about whether the corresponding channel audio data is correctly received through the wired connection after the other audio data receiving device completes receipt of corresponding channel audio data of the one audio data receiving device whose communication quality does not meet the preset requirement every time.

12. The audio data transmission method according to claim 11, wherein one of the audio data receiving devices whose communication quality fails to meet the preset requirements inquires the indication information about whether the one of the audio data receiving device receives correctly through the wired connection, when at least one of the first audio data receiving device and the second audio data receiving device receives correctly, receiving of the audio data that should be received this time and is retransmitted by the audio source device is stopped, or a confirmation information that has correctly received this time is replied;
the other audio data receiving device inquires the indication information about whether the one audio data receiving device receives correctly through the wired connection, when at least one of the first audio data receiving device and the second audio data receiving device receives correctly, receiving of the audio data that should be received this time and is retransmitted by the audio source device is stopped, or the confirmation information that has correctly received this time is replied.

13. The audio data transmission method according to claim 11, wherein the one audio data receiving device whose communication quality does not meet the preset requirement inquires the indication information about whether the other audio data receiving device receives correctly through the wired connection, when itself does not receive correctly and the other audio data receiving device receives correctly, the one audio data receiving device receives the audio data that should be received this time and is forwarded by the other audio data receiving device;
the other audio data receiving device inquires whether the one audio data receiving device receives correctly through the wired connection, when the other audio data receiving device receives correctly and the one audio data receiving device whose communication quality does not meet the preset requirement does not receive correctly, the other audio data receiving device forwards the audio data that should be received by the one audio data receiving device whose communication quality does not meet the preset requirement this time.

14. The audio data transmission method according to claim 1, wherein after it is determined that the communication quality between the one of the first audio data receiving device and the second audio data receiving device and the audio source device does not meet the preset requirement, the audio data transmission method further comprises:
   detecting whether the communication quality between the one of the first audio data receiving device and the second audio data receiving device whose communication quality does not meet the preset requirement and the audio source device reaches a preset threshold;
   switching from receiving the first channel audio data and the second channel audio data to receive one corresponding channel audio data by the other of the first audio data receiving device and the second audio data receiving device when the preset threshold is reached; and/or,
   stopping forwarding the corresponding channel audio data to the one of the first audio data receiving device and the second audio data receiving device when the preset threshold is reached.

15. The audio data transmission method according to claim 1, wherein each isochronous interval in the space diversity timeslot structure further comprises a forwarding retransmission timeslot for re-forwarding audio data between the first audio data receiving device and the second audio data receiving device.

16. The audio data transmission method according to claim 15, wherein each of the forwarding timeslot and the forwarding retransmission timeslot comprises a request sub-timeslot and a forwarding sub-timeslot, the request sub-timeslot is configured for sending or receiving a second forwarding request by the first audio data receiving device or the second audio data receiving device, and the forwarding sub-timeslot is configured for forwarding audio data between the first audio data receiving device and the second audio data receiving device.

17. The audio data transmission method according to claim 1, wherein each isochronous interval in the space diversity timeslot structure further comprises other timeslots configured for one or more of interacting communication quality information, forwarding control commands, and maintaining the communication connection between the first audio data receiving device and the second audio data receiving device.

18. An audio data transmission system, comprising: an audio source device;
   a first audio receiving device configured for receiving a first channel audio data from the audio source device based on a wireless communication protocol; and
   a second audio receiving device configured for receiving a second channel audio data from the audio source device based on the wireless communication protocol, wherein one of the first and second audio data receiving devices starts to receive the second channel audio data and the first channel audio data when a communication quality between the audio source device and either one of the first and second audio data receiving devices fails to meet a preset requirement, and the one of the first and second audio data receiving devices further forwards other one of the first and second audio data receiving devices corresponding channel audio data,
   wherein the wireless communication protocol is a Bluetooth low energy communication protocol, the first audio data receiving device and the second audio data receiving device communicate with the audio source device respectively based on a space diversity timeslot structure of a broadcast isochronous group or a connected isochronous group, and each isochronous interval in the space diversity timeslot structure comprises a receiving timeslot and one or more retransmission timeslot for receiving the first channel audio data and/or the second channel audio data from the audio source device, and also comprises a forwarding timeslot for forwarding audio data between the first audio data receiving device and the second audio data receiving device.

19. The audio data receiving device according to claim 18, wherein the first and second audio receiving devices are configured to establish a wireless communication connection therebetween to forward the first channel audio data or the second channel audio data.

* * * * *